United States Patent
Berthold et al.

(10) Patent No.: US 8,673,437 B2
(45) Date of Patent: Mar. 18, 2014

(54) FILMS HAVING IMPROVED MECHANICAL PROPERTIES

(75) Inventors: Joachim Berthold, Kelkheim (DE); Lutz-Gerd Heinicke, Eschborn (DE); Gerhardus Meier, Frankfurt (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 13/228,224

(22) Filed: Sep. 8, 2011

(65) Prior Publication Data

US 2011/0318559 A1 Dec. 29, 2011

Related U.S. Application Data

(62) Division of application No. 11/885,357, filed as application No. PCT/EP2006/060222 on Feb. 23, 2006.

(30) Foreign Application Priority Data

Mar. 1, 2005 (DE) .......................... 10 2005 009916

(51) Int. Cl.
*B32B 3/00* (2006.01)

(52) U.S. Cl.
USPC ........................................................ 428/220

(58) Field of Classification Search
USPC .......................................... 428/220; 525/240
See application file for complete search history.

(56) References Cited

U.S. PATENT DOCUMENTS

| | | | |
|---|---|---|---|
| 4,336,352 A * | 6/1982 | Sakurai et al. ................ | 525/240 |
| 4,447,587 A | 5/1984 | Berthold et al. | |
| 4,536,550 A | 8/1985 | Moriguchi et al. | |
| 5,089,322 A * | 2/1992 | Matsunaga et al. ........... | 428/220 |
| 5,338,589 A | 8/1994 | Bohm et al. | |
| 5,350,807 A | 9/1994 | Pettijohn | |
| 5,422,400 A | 6/1995 | Kamiyama et al. | |
| 5,561,195 A * | 10/1996 | Govoni et al. ................ | 525/240 |
| 5,648,309 A | 7/1997 | Bohm | |
| 5,882,750 A | 3/1999 | Mink et al. | |
| 6,136,924 A | 10/2000 | Promel | |
| 615,684 A | 12/2000 | Saito et al. | |
| 6,156,845 A * | 12/2000 | Saito et al. .................... | 525/240 |
| 6,242,548 B1 | 6/2001 | Duchesne et al. | |
| 6,329,054 B1 | 12/2001 | Rogestedt et al. | |
| 6,344,522 B1 | 2/2002 | Promel | |
| 6,407,185 B1 | 6/2002 | Promel | |
| 6,713,561 B1 * | 3/2004 | Berthold et al. .............. | 525/191 |
| 6,900,266 B2 * | 5/2005 | Raty ............................. | 524/611 |
| 2003/0055175 A1 * | 3/2003 | Klosiewicz ................... | 525/240 |
| 2003/0149180 A1 | 8/2003 | Van Dun et al. | |
| 2006/0052542 A1 | 3/2006 | Berthold et al. | |
| 2006/0074193 A1 | 4/2006 | Berthold et al. | |
| 2006/0074194 A1 | 4/2006 | Berthold et al. | |
| 2006/0155058 A1 | 7/2006 | Berthold et al. | |

FOREIGN PATENT DOCUMENTS

| | | |
|---|---|---|
| DE | 19945980 | 3/2001 |
| DE | 10259491 | 7/2004 |
| EP | 0129312 | 12/1984 |
| EP | 0068257 | 4/1985 |
| EP | 0401776 | 12/1990 |
| EP | 0492656 | 7/1992 |
| EP | 0532551 | 3/1993 |
| EP | 0603935 | 6/1994 |
| EP | 0797599 | 10/1997 |
| EP | 0905151 | 3/1999 |
| GB | 2056996 | 3/1991 |
| WO | WO-9118934 | 12/1991 |
| WO | WO-9703124 | 1/1997 |
| WO | WO-9703139 | 1/1997 |
| WO | WO-0123446 | 4/2001 |
| WO | WO-2004/056921 | 7/2004 |
| WO | WO-2004/058876 | 7/2004 |
| WO | WO-2004058877 | 7/2004 |
| WO | WO-2004058878 | 7/2004 |
| WO | WO-2006053740 | 7/2004 |
| WO | WO-2006/053741 | 5/2006 |

OTHER PUBLICATIONS

Fleissner, M , "Langsames Risswachstum und Zeitstandfestigkeit von Rohren aus Polyethylen", Kunststoffe Hoeschst v. 77 1987 , 44-50.

* cited by examiner

*Primary Examiner* — Aaron S. Austin
*Assistant Examiner* — Tahseen N Khan

(57) ABSTRACT

A blown film having a thickness from 8 to 200 μm and dart drop impact DDI of more than 400 g, comprising a polyethylene molding composition having a multimodal molar mass distribution; a density from 0.940 to 0.948 g/cm³; an $MFR_{190/5}$, from 0.10 to 0.50 dg/min; comprising:

40 to 60% of an ethylene homopolymer A having a molecular weight;

25 to 45% of a copolymer B of ethylene and at least one comonomer selected from the group of olefins having from 4 to 8 carbon atoms, said copolymer B having a molecular weight higher than said molecular weight of homopolymer A; and 10 to 30% of a copolymer C of ethylene and at least one comonomer, said copolymer C having a molecular weight higher than said molecular weight of copolymer B, all percentages being based on the total weight of the molding composition.

6 Claims, No Drawings

FILMS HAVING IMPROVED MECHANICAL PROPERTIES

CROSS-REFERENCE TO RELATED APPLICATIONS

This application is a divisional of co-pending application Ser. No. 11/885,357, filed Aug. 30, 2007, which is a U.S. national phase of International Application PCT/EP2006/060222, filed Feb. 23, 2006, claiming priority to German Patent Application 102005009916.5 filed Mar. 1, 2005; the disclosures of application Ser. No. 11/885,357, International Application PCT/EP2006/060222, and German Patent Application 102005009916.5, each as filed, are incorporated herein by reference.

FIELD OF THE INVENTION

The present invention relates to a polyethylene (PE) molding composition having a multimodal molar mass distribution, i.e. a molding composition comprising a plurality of ethylene polymer fractions having distinct molar masses.

In the present description and in the following claims, unless otherwise indicated, the term "polymer" is used to indicate both a homopolymer, i.e. a polymer comprising repeating monomeric units derived from equal species of monomers, and a copolymer, i.e. a polymer comprising repeating monomeric units derived from at least two different species of monomers, in which case reference will be made to a binary copolymer, to a terpolymer, etc. depending on the number of different species of monomers used.

The multimodal PE molding composition of the invention is particularly useful for producing blown films.

The invention also relates to a process for preparing this PE molding composition.

The invention further relates to a blown film produced from the above-mentioned molding composition by a blown film process.

PRIOR ART

Polyethylene is used on a large scale for producing films by a blown film extrusion process thanks to the mechanical strength, processability, good chemical resistance and low intrinsic weight of polyethylene. So, for example, EP-A-0 603 935 describes a molding composition based on polyethylene which has a bimodal molar mass distribution and is suitable for producing films and moldings having good mechanical properties.

However, the prior art films made of bimodal polyethylene have an inadequate mechanical strength, particularly in terms of Dart Drop Impact strength (DDI), which normally ranges from about 150 to 200 g in accordance with ASTM D 1709, method A. Attempts to attain a higher DDI, for example above 300 g, inevitably resulted in an unacceptable worsening of the processability, particularly in terms of stability of the bubble formed in the blown film extrusion process.

SUMMARY OF THE INVENTION

The technical problem underlying the present invention is therefore that of providing a novel PE molding composition having an improved mechanical strength, particularly in terms of DDI, without impairing the processability in the blown film extrusion process.

More in particular, the mechanical strength of films produced from the novel PE molding composition of the invention, expressed as DDI, should be in the range above 400 g for a film having a thickness of 20 µm. For the purpose of the present description and of the claims which follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

The above-mentioned technical problem is solved by a PE molding composition having a multimodal molar mass distribution, a density at a temperature of 23° C. in the range from 0.940 to 0.948 g/cm$^3$ and a melt flow rate MFR$_{190/5}$ of the final product after extrusion in the range from 0.10 to 0.50 dg/min, said polyethylene molding composition comprising:

from 40 to 60% by weight of a first ethylene polymer fraction made of an ethylene homopolymer A having a first molecular weight, from 25 to 45% by weight of a second ethylene polymer fraction made of a first copolymer B of ethylene and at least one first comonomer from the group of olefins having from 4 to 8 carbon atoms, said first copolymer B having a second molecular weight higher than said first molecular weight, and from 10 to 30% by weight of a third ethylene polymer fraction made of a second copolymer C of ethylene and at least one second comonomer, said second copolymer C having a third molecular weight higher than said second molecular weight, all percentages being based on the total weight of the molding composition.

In the present description and in the following claims, the melt flow rate MFR$_{190/5}$ is the melt flow rate measured in accordance with ISO 1133 at 190° C. and under a load of 5 kg. The density is determined in accordance with ISO1183.

The polyethylene molding composition of the invention has a density at a temperature of 23° C. in the range from 0.940 to 0.948 g/cm$^3$, preferably from 0.944 to 0.948 g/cm$^3$, and a broad trimodal molar mass distribution.

According to a preferred embodiment of the invention, the polyethylene molding composition comprises:

from 45 to 55% by weight of the first ethylene polymer fraction, i.e. of the homopolymer A, from 30 to 40% by weight of the second ethylene polymer fraction, i.e. of the first copolymer B, and from 15 to 25% by weight of the third ethylene polymer fraction, i.e. of the second copolymer C.

The second copolymer B preferably contains, in addition to ethylene, predetermined proportions, preferably from 0.4 to 3.0% by weight based on the weight of the second copolymer B, of at least one first olefin comonomer having from 4 to 8 carbon atoms.

Examples of such comonomer(s) are 1-butene, 1-pentene, 1-hexene, 1-octene and 4-methyl-1-pentene and mixture thereof.

In an analogous manner, the second copolymer C is preferably a copolymer of ethylene and of at least one second comonomer preferably selected from the group of olefins having from 4 to 8 carbon atoms more preferably from the above-mentioned list of comonomers.

Preferably, the at least one second comonomer is present in an amount of from 3 to 15% by weight, based on the weight of the second copolymer C.

Furthermore, the PE molding composition of the invention has a melt flow rate MFR$_{190/5}$ of the final product after extrusion in accordance with ISO 1133, in the range from 0.10 to 0.50 g/10 min, preferably from 0.15 to 0.23 g/10 min.

Preferably, the PE molding composition of the invention has a viscosity number $VN_3$, measured in accordance with ISO/R 1191 in decalin at a temperature of 135° C., in the range from 300 to 480 cm³/g, in particular from 370 to 440 cm³/g.

If, as provided by a preferred embodiment of the invention described more in detail in the following, the PE molding composition is prepared by means of a cascaded polymerization process comprising at least three successive polymerization stages comprising a first stage, a second stage and a third stage, the trimodality of the composition of the invention can be described in terms of viscosity numbers VN, measured in accordance with ISO/R 1191, of the ethylene polymer fractions formed in the different subsequent polymerization stages.

Here, the different viscosity numbers will be indicated as explained in the following.

The viscosity number $VN_1$ shall be used to indicate the viscosity number measured on the polymer after the first polymerization stage. The viscosity number $VN_1$ is identical to the viscosity number $VN_A$ of the homopolymer A.

According to a preferred embodiment of the invention, the viscosity number $VN_1$ is in the range from 60 to 110 cm³/g, more preferably from 70 to 110 cm³/g.

The viscosity number $VN_2$ shall be used to indicate the viscosity number measured on the polymer after the second polymerization stage. The viscosity number $VN_2$ is therefore the viscosity number of the mixture of homopolymer A plus first copolymer B. The viscosity number of the first copolymer B formed in the second polymerization stage can be instead determined only mathematically.

According to a preferred embodiment of the invention, the viscosity number $VN_2$ is in the range from 300 to 400 cm³/g, preferably from 320 to 380 cm³/g.

The viscosity number $VN_3$ shall be used to indicate the viscosity number measured on the polymer after the third polymerization stage. The viscosity number $VN_3$ is therefore the viscosity number of the mixture of homopolymer A plus first copolymer B plus second copolymer C. The viscosity number of the second copolymer C formed in the third polymerization stage can be instead determined only mathematically. According to a preferred embodiment of the invention, the viscosity number $VN_3$ is in the range from 300 to 480 cm³/g, in particular from 370 to 440 cm³/g.

The PE molding composition of the invention may further comprise additional additives. Such additives may be, for example, heat stabilizers, anti-oxidants, UV stabilizers, light stabilizers, metal deactivators, peroxide-destroying compounds, basic co-stabilizers in amounts of from 0 to 10% by weight, preferably from 0 to 5% by weight, but also fillers, reinforcing materials, plasticizers, lubricants, emulsifiers, pigments, optical brighteners, flame retardants, antistatics, blowing agents or combinations of these in total amounts of from 0 to 50% by weight, based on the total weight of the composition.

The present invention also relates to a process for preparing a polyethylene molding composition as described above, comprising the step of polymerizing ethylene, said at least one first comonomer and said at least one second comonomer in suspension at a temperature preferably in the range from 20 to 120° C., more preferably from 70 to 90° C. and, still more preferably, from 80 to 90° C., and at a pressure preferably in the range from 2 to 10 bar and, preferably, in the presence of a Ziegler catalyst.

The process for preparing the PE molding composition is preferably carried out in the presence of a catalytic system comprising a highly active Ziegler catalyst comprising a transition metal compound and a co-catalyst, preferably an organo-aluminum compound, by means of a multistage reaction sequence comprising at least three successive polymerizations.

Preferably, the polymerization is carried out in multiple successive polymerization stages comprising a first stage, a second stage, and a third stage performed in corresponding multiple reactors comprising a first reactor, a second reactor and a third reactor arranged in series.

The polymerization is preferably carried out in a cascaded suspension polymerization as described in EP-A-1 228 101.

The molar mass in each polymerization stage is preferably adjusted by means of a chain transfer agent, preferably hydrogen, and preferably in such a manner that the above-mentioned preferred values of viscosity numbers are obtained after each polymerization stage.

The PE molding composition of the invention is particularly suitable for the production of blown films by the blown film extrusion process. A possible way to carry out such process is detailed in the following.

The polyethylene molding composition is preferably firstly plasticized at temperatures in the range from 200 to 250° C. in an extruder. Subsequently, the plasticized polyethylene is extruded in the molten state through an annular die so as to form a bubble having a substantially tubular form. The bubble is cooled, preferably by means of compressed air, and subsequently collapsed by means of rollers and rolled up into a film.

The molding composition of the invention can be processed particularly well by the film blowing process because this composition ensures an adequate film bubble stability even under the typical processing conditions of large scale industrial plants. In other words, the film bubble coming out from the annular die remains stable even at high take-off speeds and shows no tendency to alter its geometry neither in axial direction nor in radial direction.

Preferably, the bubble has a frost line delimiting the molten material from the solidified material oscillating not more than ±2 cm in axial direction during the shock test (performed as detailed in following Example 3) at a maximal take-off speed.

The invention further relates to a film comprising a PE molding composition as described above and having a thickness in the range from 8 to 200 μm, preferably from 10 to 100 μm. Preferably, the a DDI of a film having a thickness of 20 μm is higher than 400 g, more preferably higher than 450 g and, still more preferably, higher than 460 g.

DETAILED DESCRIPTION OF THE PREFERRED EMBODIMENTS

The present invention will be further described by means of the following preferred embodiments without restricting the scope of the invention.

EXAMPLE 1

Polymerization (Invention)

Ethylene was polymerized in a continuous process performed in a cascaded mode in three reactors reciprocally arranged in series. A Ziegler catalyst prepared by the method of EP-A 401 776, Example 1, was used, having an extremely high responsiveness to hydrogen and an activity sufficient to carry out the cascaded polymerization, since this catalyst was able to maintain the activity over a long period, from 1 to 8 hours.

The catalyst had in particular the following analytical composition:

| Ti | 6.2% by weight |
|---|---|
| Mg | 70.8% by weight |
| Cl | 23.0% by weight. |

The catalyst was pre-activated by means of a sufficient amount of triethylaluminum and then fed into a first reactor in an amount of 4.8 mmol/h.

Sufficient suspension medium, in particular hexane, ethylene and hydrogen were additionally fed in the first reactor. The amount of ethylene (=46 kg/h) and the amount of hydrogen (=58 g/h) were set in such a manner that a percentage of 17% by volume of ethylene and a percentage of 69% by volume of hydrogen were measured in the gas space (gas temperature for the analytical measurement=5±1° C.) of the first reactor. The remainder was a mixture of nitrogen and vaporized suspension medium.

The polymerization in the first reactor was carried out at a temperature of 84° C. and under a pressure of 8.9 bar, corresponding to 0.89 MPa.

The suspension from the first reactor was then conveyed into a second reactor arranged in series with and downstream of the first reactor. The percentage of hydrogen in the gas space (gas temperature for the analytical measurement=5±1° C.) in the second reactor was reduced to 3.6% by volume by means of an intermediate $H_2$ depressurization. An amount of 32.6 kg/h of ethylene together with an amount of 300 g amount of a first comonomer, namely 1-butene, were introduced into the second reactor. 69% by volume of ethylene, 3.6% by volume of hydrogen and 2.9% by volume of 1-butene were measured in the gas space of the second reactor; the remainder was a mixture of nitrogen and vaporized suspension medium. The polymerization in the second reactor was carried out at a temperature of 84° C. and under a pressure of 2.5 bar, corresponding to 0.25 MPa.

The suspension from the second reactor was conveyed via a further intermediate depressurization operated without offgas into a third reactor arranged in series with and downstream of the second reactor. The hydrogen concentration was set to 3.2% by volume in the gas space by introducing hydrogen. Apart from 17.2 kg/h of ethylene, 1680 g/h of a second comonomer equal to the first comonomer introduced in the second stage, namely 1-butene, and 1.5 g/h of hydrogen were additionally introduced into the third reactor.

A percentage of ethylene of 67% by volume, a percentage of hydrogen of 3.2% by volume and a percentage of 1-butene of 9.7% by volume were measured in the gas space of the third reactor (gas temperature for the analytical measurement=5±1° C.); the remainder was a mixture of nitrogen and vaporized suspension medium.

The polymerization in the third reactor was carried out at a temperature of 84° C. and under a pressure of 2.7 bar, corresponding to 0.27 MPa.

The suspension medium was separated off from the polymer suspension leaving the third reactor and the powder was dried and passed to pelletization.

The polyethylene molding composition prepared as described above had a density of 0.946 g/cm³, viscosity numbers $VN_1$, $VN_2$ and $VN_3$, proportions $w_A$, $w_B$ and $w_C$ of the homopolymer A, of the first copolymer B and, respectively, of the second copolymer C and melt flow rates $MFR_1$, $MFR_2$ and $MFR_3$ which are reported in Table 1 below.

TABLE 1

| Example | 1 |
|---|---|
| $W_A$ [% by weight] | 48 |
| $W_B$ [% by weight] | 34 |
| $W_C$ [% by weight] | 18 |
| $VN_1$ [cm³/g] | 80 |
| $VN_2$ [cm³/g] | 355 |
| $VN_3$ [cm³/g] | 410 |
| $MFR_{1(190° C./1.2 kg)}$ [g/10 min] | 85 |
| $MFR_{2(190° C./5 kg)}$ [g/10 min] | 0.75 |
| $MFR_{3(190° C./5 kg)}$ [g/10 min] | 0.3 |
| $MFR_{pellets(190° C./5 kg)}$ [g/10 min] | 0.19 |

The abbreviations for the physical properties in Table 1 have the following meanings:

$w_A$, $w_B$, $w_C$=proportion of homopolymer A, first copolymer B and, respectively, second copolymer C in the total molding composition=reactor split, determined by the amount of ethylene fed into the respective reactor;

$VN_1$, $VN_2$, $VN_3$=viscosity number of the polymer leaving the first, second and, respectively, third reactor measured in accordance with ISO/R 1191 in decalin at a temperature of 135° C.;

$MFR_1$, $MFR_2$, $MFR_3$=melt flow rate of the polymer leaving the first, second and, respectively, third reactor, measured in accordance with ISO 1133 with indication of the temperature and the load;

$MFR_{pellets}$=melt flow rate of the final product after extrusion.

Example 2

Film Preparation (Invention)

From the molding composition so prepared, a film was produced in the following way.

A film having a thickness of 20 μm was produced on an Alpine film blowing plant comprising an extruder with a diameter $d_1$ of 50 mm and a length of 21×$d_1$ (=1.05 m) and an annular die having a diameter $d_2$ of 120 mm and a gap width of 1 mm. The film was produced at a blow-up ratio of 4:1 and a neck length of 7.5×$d_2$ (=90 cm). The melt temperature of the molding composition in the extruder was 225-230° C.

The film properties are shown in Table 2 below.

Example 3

Film Preparation (Comparison)

A 20 μm film was produced using a commercial film raw material from Borealis, which is commercially available under the designation FS 1470, on the same plant and under the same conditions described in Example 2 with the exception that the melt temperature of the molding composition in the extruder was 220-225° C.

The film properties are shown in Table 2 below.

TABLE 2

|  | Example 2 (invention) | Example 3 (comparison) |
|---|---|---|
| Take-off: 58 m/min | + | + |
| Shock test: | + | + |

TABLE 2-continued

| | Example 2 (invention) | Example 3 (comparison) |
|---|---|---|
| Take-off: 63 m/min | + | + |
| Shock test: | + | − |
| Take-off: 70 m/min | + | − |
| Shock test: | + | − |
| Take-off: 77 m/min | + | − |
| Shock test: | + | − |
| Take-off: 87 m/min | + | − |
| Shock test: | + | − |
| DDI [g] | 480 | 390 |
| Specks | No specks | high specks count |
| Melt pressure [bar] | 360 | 380 |

More in particular, the film bubble stability was determined by the following procedure, including a preliminary test and a shock test as detailed below.

In the preliminary test, the take-off speed was set at predetermined increasing take-off speeds, namely are 58, 63, 70, 77 and 87 m/min (=maximum rolling-up speed). After the respective take-off speed had been attained and the neck length had been adjusted to 90 cm by adjusting the cooling air blower, the axial oscillation of the film bubble was observed.

The test was considered finished and passed at a given speed if the axial oscillation of the bubble being formed was in the range of ±2 cm over a period of observation of one (1) minute.

The shock test was subsequently carried out at the same take-off speed setting as in the preliminary test. In the shock test, the bubble was made axially oscillate. This was performed by fully opening the iris of the cooling air blower for a period of about 7 s. The iris was then reset to the initial position. The opening and closing of the iris was monitored via the pressure of the cooling air. At room temperature greater than 25° C., however, the opening of the above-mentioned iris alone is not sufficient to set the film bubble into oscillation. Accordingly, at temperatures greater than 25° C., the iris was firstly opened and then shut completely for a maximum of 3 s, after which it was reset to the initial position, always monitoring by means of the air pressure. The shock test was considered passed at a given take-off speed if the oscillations of the film bubble had abated to ±2 cm within 2 minutes.

This was made for each one of the above-mentioned increasing take-off speeds. If the shock test or the preliminary test was not passed at a particular take-off speed, the stability grade corresponding to the previous lower take-off speed was awarded.

The dart drop impact strength of the films was determined according to the standard ASTM D 1709, method A.

The assessment of specks was carried out visually.

The invention claimed is:

1. A blown film having:
   (i) a thickness in the range from 8 to 200 μm;
   (ii) a dart drop impact of more than 400 g
      (a) when the dart drop impact is measured according to ASTM D1709 method A; and,
      (b) when the dart drop impact is measured on a film having a thickness of 20 μm,
   wherein the blown film comprises a polyethylene composition,
   wherein the polyethylene composition has:
      (i) a multimodal molar mass distribution;
      iii) a density between 0.940 and 0.948 g/cm$^3$,
         (a) when the density is measured according to ISO 1183, and
         (b) when the density is measured at a temperature of 23° C.; and
      (iii) an MFR$_{190/5}$ between 0.10 and 0.50 dg/min,
         (a) when the MFR$_{190/5}$ is measured according to ISO 1133, and
         (b) when the MFR$_{190/5}$ is measured after the polyethylene composition has been extruded;
   wherein the said polyethylene composition comprises:
      (A) 45 to 55% by weight, based on the total weight of the polyethylene composition, of a first ethylene polymer fraction comprising an ethylene homopolymer A having a first molecular weight;
      (B) 30 to 40% by weight, based on the total weight of the polyethylene composition, of a second ethylene polymer fraction comprising:
         (i) a first copolymer B of ethylene, and
         (ii) at least one first comonomer selected from the group of olefins having from 4 to 8 carbon atoms,
         wherein the first copolymer B has a second molecular weight, and
         wherein the second molecular weight is higher than the first molecular weight; and
      (C) 15 to 25% by weight, based on the total weight of the polyethylene composition, of a third ethylene polymer fraction comprising:
         (i) a second copolymer C of ethylene, and
         (ii) at least one second comonomer,
         wherein the second copolymer C has a third molecular weight, and
         wherein the third molecular weight is higher than said second molecular weight,
   wherein the polyethylene composition has a viscosity number VN$_2$ in the range from 320 to 380 cm$^3$/g.

2. The blown film of claim 1, wherein said first comonomer and said second comonomer are independently selected from the group consisting of 1-butene, 1-pentene, 1-hexene, 1-octene, 4-methyl-1-pentene and mixtures thereof.

3. The blown film of claim 1, wherein the MFR$_{190/5}$ of the polyethylene composition is in the range from 0.15 to 0.23 dg/min.

4. The blown film of claim 3, wherein the polyethylene composition has a broad trimodal mass distribution and a viscosity number VN$_3$, measured in accordance with ISO/R 1191 in decalin at a temperature of 135° C., of 300 to 480 cm$^3$/g.

5. A film comprising;
   a polyethylene composition, wherein the polyethylene composition has:
      (i) a multimodal molar mass distribution;
      (ii) a density between 0.940 and 0.948 g/cm$^3$,
         (a) when the density is measured according to ISO 1183, and
         (b) when the density is measured at a temperature of 23° C.;
      (iii) an MFR$_{190/5}$ between 0.10 and 0.50 dg/min,
         (a) when the MFR$_{190/5}$ is measured according to ISO 1133, and
         (b) when the MFR$_{190/5}$ is measured after the polyethylene composition has been extruded;
   wherein the said polyethylene composition comprises:
      (A) 45 to 55% by weight, based on the total weight of the polyethylene composition, of a first ethylene polymer fraction comprising an ethylene homopolymer A having a first molecular weight;
      (B) 30 to 40% by weight, based on the total weight of the polyethylene composition, of a second ethylene polymer fraction comprising:

(i) a first copolymer B of ethylene, and
(ii) at least one first comonomer selected from the group of olefins having from 4 to 8 carbon atoms,
wherein the first copolymer B has a second molecular weight, and
wherein the second molecular weight is higher than the first molecular weight; and
(C) 15 to 25% by weight, based on the total weight of the polyethylene composition, of a third ethylene polymer fraction comprising:
(i) a second copolymer C of ethylene, and
(ii) at least one second comonomer,
wherein the second copolymer C has a third molecular weight, and
wherein the third molecular weight is higher than said second molecular weight,
wherein the film has a thickness of 8 to 200 μm wherein the polyethylene composition has a viscosity number $VN_2$ in the range from 320 to 380 cm$^3$/g.

6. A blown film having:
(i) a thickness in the range from 8 to 200 μm;
(ii) a dart drop impact of more than 400 g
   (a) when the dart drop impact is measured according to ASTM D1709 method A; and,
   (b) when the dart drop impact is measured on a film having a thickness of 20 μm,
wherein the blown film comprises a polyethylene composition,
wherein the polyethylene composition has:
   (i) a multimodal molar mass distribution;
   (ii) a density between 0.944 and 0.948 g/cm$^3$,
      (a) when the density is measured according to ISO 1183, and
      (b) when the density is measured at a temperature of 23° C.;
   (iii) an $MFR_{190/5}$ between 0.15 and 0.23 dg/min,
      (a) when the $MFR_{190/5}$ is measured according to ISO 1133, and
      (b) when the $MFR_{190/5}$ is measured after the polyethylene composition has been extruded;
wherein the said polyethylene composition comprises:
(A) 45 to 55% by weight, based on the total weight of the polyethylene composition, of a first ethylene polymer fraction comprising an ethylene homopolymer A having a first molecular weight;
(B) 30 to 40% by weight, based on the total weight of the polyethylene composition, of a second ethylene polymer fraction comprising:
   (i) a first copolymer B of ethylene, and
   (ii) at least one first comonomer selected from the group of olefins having from 4 to 8 carbon atoms,
   wherein the said first copolymer B has a second molecular weight, and
   wherein the second molecular weight is higher than the first molecular weight; and
(C) 15 to 25% by weight, based on the total weight of the polyethylene composition, of a third ethylene polymer fraction comprising:
   (i) a second copolymer C of ethylene, and
   (ii) at least one second comonomer,
   wherein the second copolymer C has a third molecular weight, and
   wherein the third molecular weight is higher than said second molecular weight,
wherein the polyethylene composition has a viscosity number $VN_2$ in the range from 320 to 380 cm$^3$/g.

* * * * *